No. 646,837. Patented Apr. 3, 1900.
I. H. JEWELL.
FILTER SCREEN.
(Application filed Feb. 5, 1900.)
(No Model.) 4 Sheets—Sheet 1.
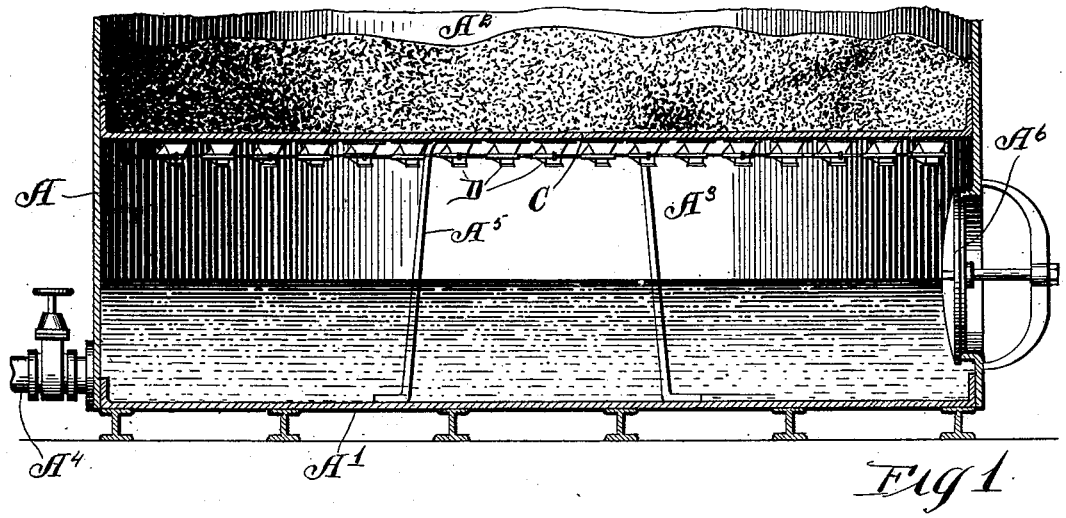
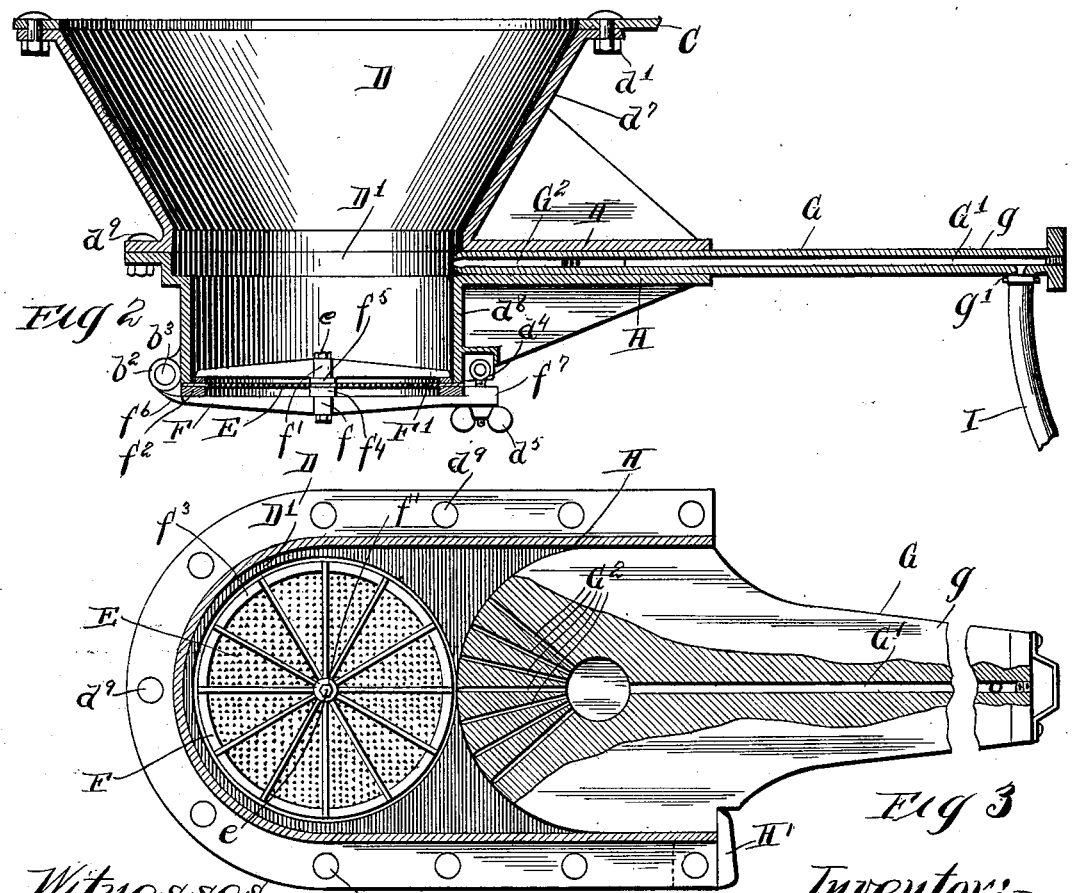
Witnesses
Carl H. Crawford
William H. Hall
Inventor:-
Ira H. Jewell
by Poole & Brown
his Attorneys No. 646,837. Patented Apr. 3, 1900.
I. H. JEWELL.
FILTER SCREEN.
(Application filed Feb. 5, 1900.)
(No Model.) 4 Sheets—Sheet 2.
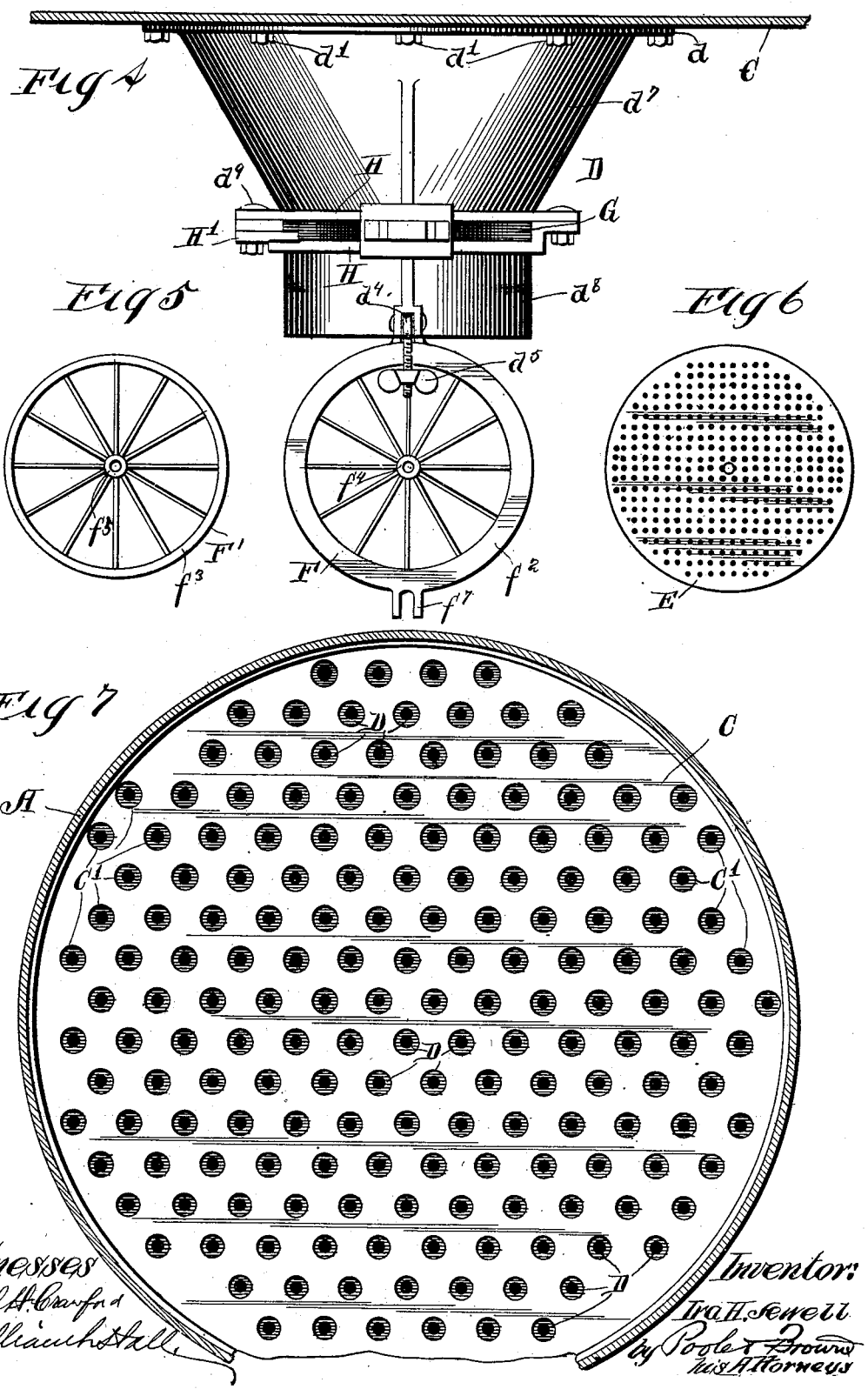

No. 646,837. Patented Apr. 3, 1900.
I. H. JEWELL.
FILTER SCREEN.
(Application filed Feb. 5, 1900.)
(No Model.) 4 Sheets—Sheet 3.
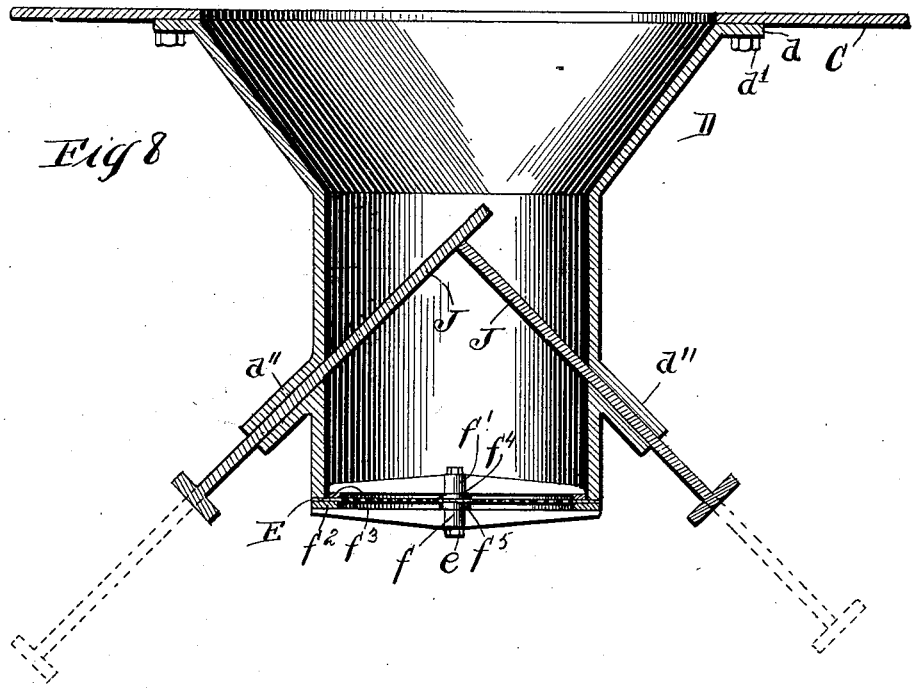
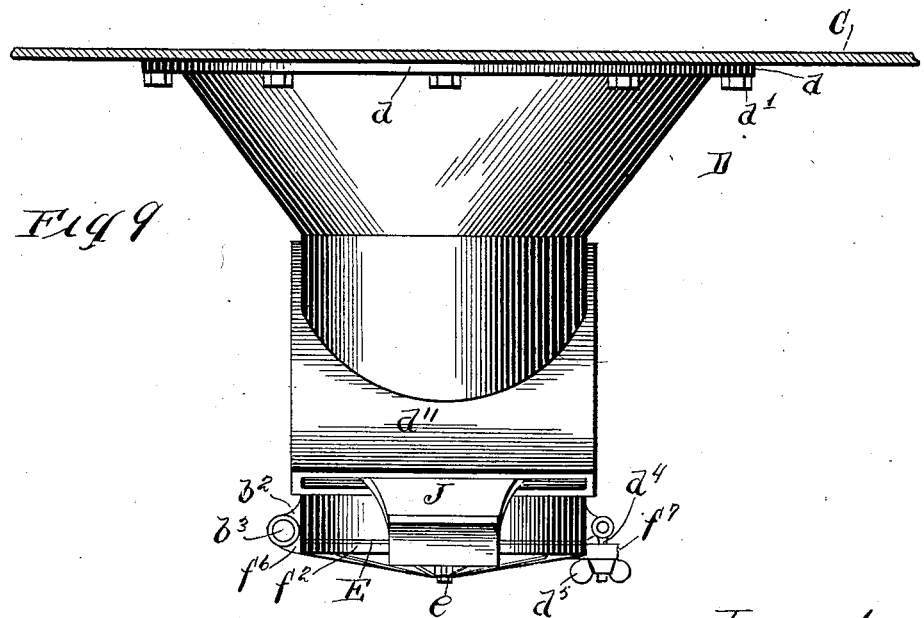
Witnesses:
Carl H. Crawford
William H. Hall
Inventor:
Ira H. Jewell
by Poole & Brown
his Attorneys

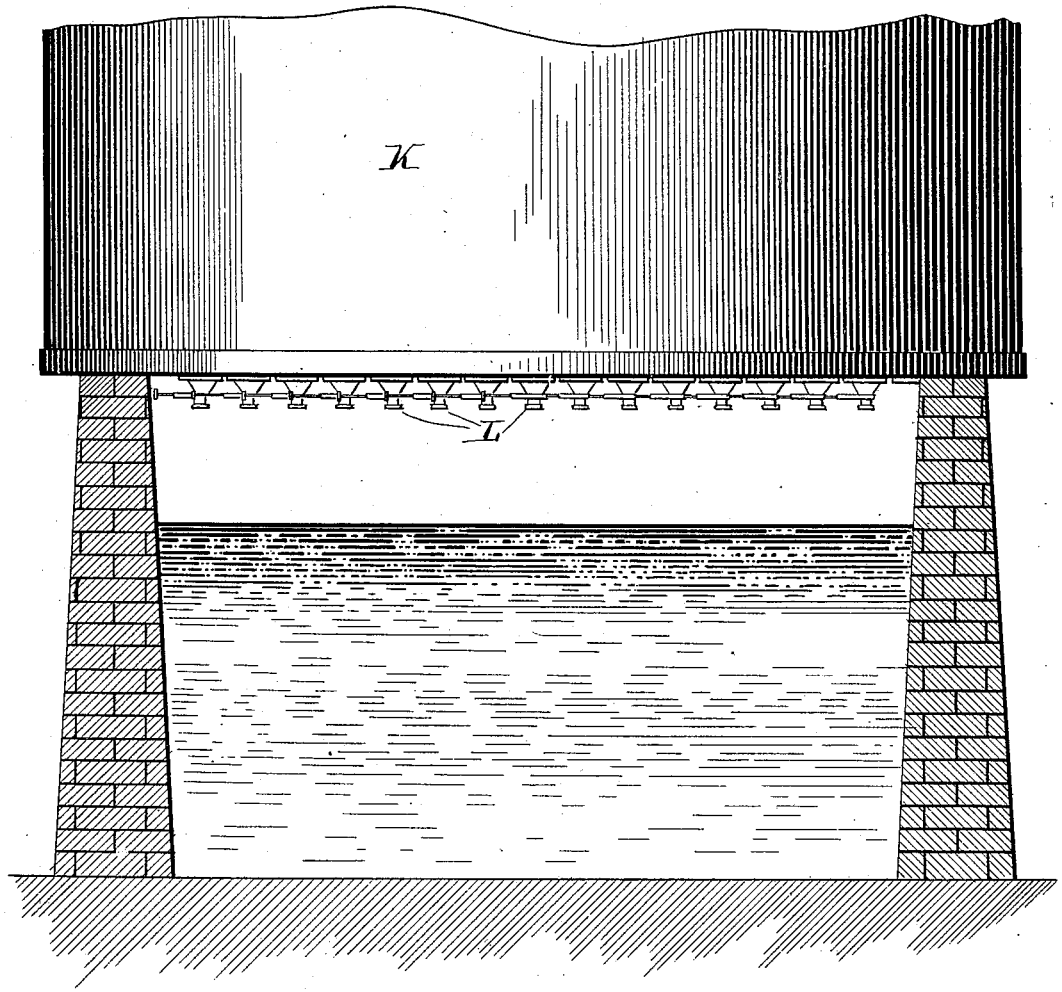

UNITED STATES PATENT OFFICE.

IRA H. JEWELL, OF CHICAGO, ILLINOIS.

FILTER-SCREEN.

SPECIFICATION forming part of Letters Patent No. 646,837, dated April 3, 1900.

Application filed February 5, 1900. Serial No. 3,957. (No model.)

*To all whom it may concern:*

Be it known that I, IRA H. JEWELL, of Chicago, in the county of Cook and State of Illinois, have invented certain new and useful Improvements in Filter-Screens; and I do hereby declare that the following is a full, clear, and exact description thereof, reference being had to the accompanying drawings, and to the letters of reference marked thereon, which form a part of this specification.

This invention relates to improvements in screens for water-filters wherein the filtering material is of a granular character; and the object of the invention is to provide a screen which will be accessible when the filter-bed is intact for the purpose of cleaning or repairing and therefore without the necessity of removing the filtering material.

Filters of the character above stated consist, essentially, of a chamber or tank having a filter-bed bottom, a mass of granular material, such as sand, in said tank constituting the filter-bed, and one or more screens located beneath the filter-bed in position for the water to pass therethrough and through the filter-bed. Heretofore in filters of this class it has been the practice to place the screens within the chamber containing the filter-bed and with the filter-bed resting thereon. After a certain period of use it is found that the screens become clogged, so as to limit the flow of the water therethrough in a given time, and therefore limit the capacity of the filter. Furthermore, such screens become worn for various reasons and are required from time to time to be replaced by perfect screens. Various mechanical devices have been heretofore constructed to keep the screens cleaned and have been designed to be brought into use during the usual operation of the filter. Such mechanical cleaning devices, however, have not been found to be effective for the purpose designed, and it has been found necessary in practice, in order to properly clean the screens, for the attendant to have free access to them. Owing to the location of the screens within the tank containing the filter-bed, it has been necessary heretofore to remove the entire filter-bed before the screens are accessible, thereby necessitating a large amount of labor and expense, as well as putting the filter out of use for a length of time greater than that required for the actual cleaning or repairing work. Furthermore, it often occurs with filters having a plurality of screens that one or a less number than all of the screens become clogged while the remainder of the screens are in good working order. In accordance with the prior practice, however, to gain access to those which need to be cleaned the entire filter-bed may be required to be removed. My invention is designed to overcome this difficulty and to render the screens accessible at all times for cleaning and repairing without the necessity of removing the filter-bed and without unduly interrupting the operation of filtering either when one or all of the screens are to be cleaned.

The invention consists in the matters hereinafter set forth, and more particularly pointed out in the appended claims.

In the drawings, Figure 1 is a longitudinal vertical section taken through the lower part of a filter embodying my invention. Fig. 2 is a central vertical section of one of the tubular screen-holders, which is connected with the filter-bed and at the lower ends of which the screens are located. Fig. 3 is a horizontal section of said tubular screen-holder. Fig. 4 is a side elevation of said screen-holder looking at the same at right angles to the plane of the view shown in Fig. 2 and showing the screen removed therefrom. Fig. 5 is a plan view of one of the clamping members by which the screen is held in place. Fig. 6 is a plan view of one of the screens. Fig. 7 is a plan view of the filter-bed bottom. Fig. 8 is a central vertical section of a modified form of screen-holder. Fig. 9 is a side elevation of the same. Fig. 10 shows my invention applied to another form of filter.

This invention is shown in Fig. 1 as applied to a filter comprising two superposed chambers, one containing the filter-bed and the other serving as a filtered-water chamber; but the invention may be applied to a filter wherein the water-chamber does not constitute a part of the filter, as shown in Fig. 10.

First referring to the construction shown in Figs. 1 to 7, inclusive, A indicates the vertical wall of a filter-tank, and A' the bottom wall thereof. C designates a horizontal partition located a distance above the bottom wall of the tank and which divides said tank into a chamber $A^2$, in which the filter-bed is contained, and a chamber $A^3$, into which the filtered water passes and from which it is discharged through an outlet-pipe $A^4$. The partition C is herein shown as supported by upright standards $A^5$, resting on the bottom wall $A^7$. A greater number of standards will be employed in practice than herein shown and may be made of other construction; but such details have been omitted for sake of more clearly showing the principal features of my invention.

$A^6$ designates a manhole-cover which closes a manhole in the side wall of the tank below the partition C and through which a person may enter the water-chamber $A^3$ for the purpose of cleaning the filter-screens.

The partition C is provided with a plurality of openings $C'$, extending therethrough and through which the water passes from the filter-bed to the water-chamber $A^3$. Depending from the bottom of said partition C are a plurality of tubular screen-holders D, in the lower ends of which the screens E are held. Each holder is provided on its upper end with a radial annular flange $d$ and is secured to the partition C by bolts $d'$, passing through said flange and partition. The upper ends of the holders are made flaring, as clearly shown in Fig. 2, so that the openings in the partition C, which are thus made larger than the openings in the lower ends of the holders, may be placed close together without locating the lower ends of the holders so close together as to make them inconvenient of access. Such arrangement of the openings is furthermore advantageous by reason of the fact that it tends to more uniformly distribute the water throughout the filter-bed both in the operation of filtration and also when the filter-bed is being cleaned by forcing water upwardly therethrough in a well-known manner.

The screen E of each holder is held in place at the bottom of the holder between two annular spiders F F', said spiders each consisting of an annular rim, a central hub, and radiating arms connecting the rim and hub. Said screen is held in place between said spiders through the medium of a clamping-bolt $e$, which passes through openings in the hubs $f f'$ of the spiders and clamps the said spiders together, with the screen between the rims $f^2 f^3$ thereof. The said hubs are provided with inwardly-projecting bosses $f^4 f^5$, which bear against the opposite sides of the screens and serve to hold the central portion of the screen stationary. The presence of the bosses separates the arms of the spider from the screen and does not therefore interfere with the passage of the water through the screen.

The spider F is hinged at one side thereof to the holder, being provided at its margin with a lug $f^6$, which has overlapping engagement with lugs $b^2$ on the holder and connected therewith by means of a pivot-pin $b^3$. The opposite side of the spider is provided with a divided lug $f^7$, which when the screen and spiders are in their upper positions are engaged by a clamping-bolt $d^4$, pivoted to the wall of the holder. Said bolt is provided on its lower end with a wing-nut $d^5$, which holds the spider in its uppermost position when the bolt is engaged therewith.

When the filter is in operation, the space $A^2$ and holders D are filled with the granular filtering material, such as sand, the screens being in their upper positions, as shown in Fig. 2, and holding said filtering material within said holders. Said screens, as before stated, tend to become clogged, so as to prevent the free passage of the water therethrough, and it therefore becomes necessary to at times clean the same. Moreover, it often becomes necessary in the life of the filter to replace the screens. Said screens by reason of their location and the manner of holding the same in place are readily accessible and may be removed by swinging the clamping-spiders downwardly, as shown in Fig. 4, and releasing the bolt $e$ from the spiders. In order to do this, however, it becomes necessary to close the screen-holders D to prevent the superposed granular filtering material from escaping therethrough. For this purpose I have provided means for closing said holders D when the screens are to be cleaned or replaced.

As shown in Figs. 1 to 4, inclusive, G designates a flat plate constituting a valve which passes through a horizontal slot in the wall of the holder and engages when in its closed position a guide-groove $D'$ on the inner surface of the holder-wall, said plate being curved at its inner end to conform to the curvature of the holder. The plate is made of a width at its widest part equal to the diameter of the said groove $D'$, so that when in its inner position it entirely cuts off the upper end of the holder from the lower end thereof. H H designate horizontal vertically-separated guides between which the valve G slides, the space between the guides for this purpose being located in line with the groove $D'$ within the holder and the lateral bearing-surfaces being located in line with the widest parts of the guide-groove $D'$.

For convenience of construction the holder D is made in two parts—an upper section $d^7$ and a lower part $d^8$—which are provided on their meeting edges with radial annular flanges, and said parts are fastened together by means of bolts $d^9$, passing through said radial flanges. The upper part of said section $d^8$ is provided with an annular rabbet, which, together with the inner part of the lower surface of the flange of the section $d^7$, constitutes the guide-grooves $D'$. One of the guides H is integral with one of the sections of the holder and the other guide is made integral with the other section thereof.

The valves G are normally in the position shown in Fig. 2—that is, with the wider parts thereof located between the guides and outside of the bores of the holders. When it is desired to clean the filter-screens, the valves will be moved inwardly, so as to bring the inner edges thereof in contact with the parts of the grooves located opposite the guides. The screens to be cleaned are then swung downwardly one at a time, and that part of the sand or filtering material between the valves and the screens will fall outwardly into the water-chamber; but such quantity is inconsiderable and may be easily removed. After the screens have been severally cleaned or replaced by new ones the spiders and screens will be fastened in their closing positions, after which the valves will be withdrawn and the holders will be again filled with the filtering material from the superposed mass and the filter will be in condition for operation.

It may sometimes occur by reason of the granular filtering material within the holder D becoming wet and packed that it requires considerable force to move the valve G into its innermost or closing position. In order to aid such inward movement, each valve is provided with a longitudinally-extending passage G', which passes outwardly through the shank $g$ of the valve and is connected at its inner end with a plurality of radially-arranged exit-passages $G^2$ $G^2$, which discharge at the inner edge of the valve. Said shank is provided at its outer end with a depending nipple $g'$, having an axial passage connected with the passage G' of the valve and to which may be attached a hose I, adapted to be connected at its other end with a source supplying water under pressure. When the valve is to be moved through the mass of filtering material to close the holder, the water is turned into the passages G' $G^2$ through the hose I and passes outwardly from the inner edge of the valve in the form of a blast and cuts or washes away the sand in advance of the valve and makes it easier to move the valve into its closing position. The hose may be connected with a source supplying air under pressure. Said holders D are so located with respect to each other, as shown in Fig. 7, to provide ample space for a person cleaning the filter to have access to the stems, which will usually be driven into place by a mallet or the like.

In order to prevent the valve from being wholly disconnected from the screen, a stop H' is shown in Fig. 3 at the end of one of the guides H, adapted to engage an outwardly-facing shoulder on the valve. Said stop is removably attached to the guide, so as to permit the entrance of the valve in the first instance and permit it to be detached when desired.

In Figs. 8 and 9 I have shown a modification of the means for closing the holder and cutting off the filtering material from the screens. In this construction the holder and screen are made substantially like the same parts shown in Fig. 2, and said parts are designated by the same reference-letters. The closing means in this instance consists of two valves J J, which pass through oppositely-located slots in the walls of the holder and are arranged at an upwardly-inclined angle to the horizontal, so that when both gates are moved inwardly they meet above the level of the slots in the walls through which they pass and together form a closure which prevents the filtering material located above the valves from dropping below the same and into the water-space $A^3$ when the screen is thrown downwardly. Said valves J may by reason of their inclination be moved in their closing position with less force than is required to move the valves G directly across the body of said filtering material. The walls of the holder D in Fig. 8 are provided with guides $d^{11}$, which give lateral stability to said valves. The valves are shown in full lines in their closing position, and in dotted lines the shanks are indicated in a position which they will occupy when the valves are withdrawn. The operation of this form of holder is substantially like that of the holder before described. It will be noted that the construction of the screen-holders and the location of the screens do not interfere with the cleaning of the filter-bed in accordance with the usual practice of cleaning this type of filters, which consists in reversing the direction of the current of water through the bed.

I do not wish to be limited to the construction of the holder for the screens nor the means for supporting the filtering-bed when the screens are being cleaned, except as herein made the subject of specific claims, as the same may be variously made. Moreover, my invention may be applied to a filter wherein the filtered-water tank constitutes no part of the filter proper. Such a construction is shown in Fig. 10. In said figure, K designates a tank containing the filter-bed, and L the screen-holders, made like those shown in Fig. 2. The tank will be supported in any convenient manner (not shown) over a reservoir or tank into which the filtered water is directed. The filter-bed of the construction shown in Fig. 10 may be cleaned by the method set forth in my prior patent, No. 587,969, granted August 10, 1897.

Obviously the screen may be cleaned from below by a brush or like means without swinging it out of its operative position, in which event the screen-frame tends to hold the filter-bed intact.

A main or principal advantage of my construction is that the screens are accessible for the purpose of cleaning or removing and replacing the same when the filter-bed is in place and intact, so that no necessity arises for removing the filter-bed when the screens are to be cleaned or repaired. A large amount of time and expense is therefore saved when this work is required to be done, and the only time necessary to suspend the operation of the filter is that occupied in the cleaning or repairing operation. Moreover, if a less number than the whole of the screens require attention the time necessary to give to the work will be proportionate to the work to be done.

In accordance with the prior practice when the screens are to be cleaned or replaced the filter-bed is required to be removed whether one or all the screens require attention, thereby involving not only a great deal of labor and expense, but necessarily suspending the operation of the filter for a much longer time than required for the work of cleaning or repairing. Owing to such circumstances the usual results are that the screens are allowed to remain foul for a considerable time before cleaning because of the great annoyance and expense incident to cleaning the screens, so that a large portion of the time the capacity of the filter is reduced. With my invention, on the other hand, but little time is required to clean the screens, so that the filter may be kept up to its normal capacity with little expense of time and labor.

It will be obvious that the filter shown in Fig. 1 may be used to carry on upward filtration by pressure, in which event the chamber $A^3$ will constitute a settling-tank and the pipe $A^4$ an inlet-pipe, and the filtered water will pass off at the top of the filter-bed. The reference to the chamber $A^3$ as a water-chamber is therefore intended to include either a chamber for filtered water or a settling-tank.

I claim as my invention—

1. A filter-screen located beneath a filter-bed and means for retaining the filter-bed intact while allowing access for cleaning or replacing the screen.

2. A filter-screen located beneath a filter-bed and provided between the same and the filter-bed with a valve whereby the screen may be cleaned or repaired without removing the filter-bed.

3. A filter-screen located beneath a filter-bed, and a valve between the screen and bed.

4. A tubular screen-holder located beneath a filter-bed, a screen in the lower end thereof, and means for closing the holder.

5. A tubular screen-holder located beneath a filter-bed, a screen removably contained in the lower end of the holder, and means for closing the holder above the screen.

6. A tubular screen-holder located beneath a filter-bed, a screen in the lower end thereof, and a valve for closing said holder having a shank which projects outside the holder.

7. A tubular screen-holder located beneath a filter-bed, a screen in the lower end thereof, a valve for closing said holder and means for injecting a blast into said holder in advance of the valve.

8. A tubular screen-holder located beneath a filter-bed, a screen in the lower end thereof, and a valve for closing said holder having a shank projecting outside the holder, said valve and shank being provided with a passage adapted for connection at one end with a hose and discharging at its other end in advance of the valve.

9. A tubular screen-holder located beneath a filter-bed, a screen in the lower end thereof, two clamping members between which the screen is held, one of which is hinged to the holder, and means for closing the holder above the screen.

10. The combination, in a filter, comprising two superposed chambers, one adapted to be filled with a filtering material, and the other serving as a water-chamber, of a screen located between said filtering material and the water-chamber and accessible from the water-chamber, and means for isolating said filtering material from the screen when the screen is to be cleaned or repaired.

11. The combination, in a filter, comprising two superposed chambers, one adapted to contain a filtering material and the other serving as a water-chamber, said chambers being connected by a passage, of a screen located in said passage which is accessible from the water-chamber, and means for closing said passage between the screen and the filtering material.

12. The combination, in a filter, comprising two superposed chambers, one of which is adapted to contain a filtering material and the other one of which serves as a water-chamber, and a passage connecting said chambers, of a screen in the outer end of said passage and accessible from the water-chamber, and a valve adapted to close said passage above said screen.

13. The combination, in a filter, comprising two superposed chambers, one adapted to be filled with a filtering material, and the other serving as a water-chamber, the wall between said chambers being provided with a plurality of openings, of a plurality of tubular screen-holders attached to said wall in line with said openings, screens in the outer ends of said holders, and means for closing said tubular holders above said screens.

14. The combination, in a filter, comprising a filter-bed and a support therefor, of a plurality of screens located beneath the filter-bed and in contact therewith, and means for retaining the filter-bed substantially intact while allowing access to the screens for cleaning or replacing the screens.

15. The combination, in a filter comprising two superposed chambers, the upper one of which is adapted to contain the filter-bed, screen-holders depending below the filter-bed into the lower chamber, screens in said holders, and means for closing the holders.

In testimony that I claim the foregoing as my invention I affix my signature, in presence of two witnesses, this 2d day of February, A. D. 1900.

IRA H. JEWELL.

Witnesses:
TAYLOR E. BROWN,
WILLIAM L. HALL.